A. M. CHAPEL & J. G. HUBBARD.

Fly-Traps.

No. 133,354.            Patented Nov. 26, 1872.

UNITED STATES PATENT OFFICE.

ADDISON M. CHAPEL AND JAMES G. HUBBARD, OF PITTSFIELD, MASS.

IMPROVEMENT IN FLY-TRAPS.

Specification forming part of Letters Patent No. 133,354, dated November 26, 1872.

*To all whom it may concern:*

Figure 1:
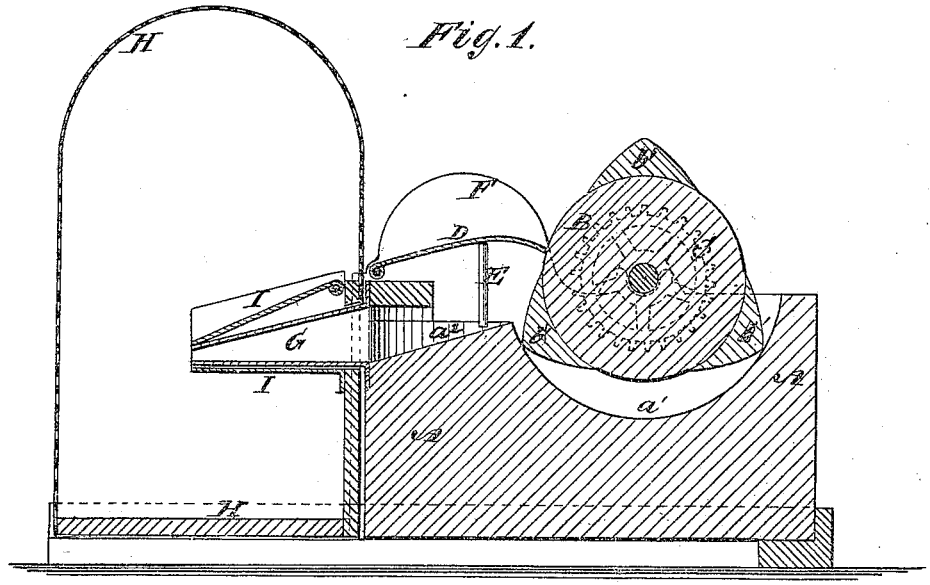
Figure 2:
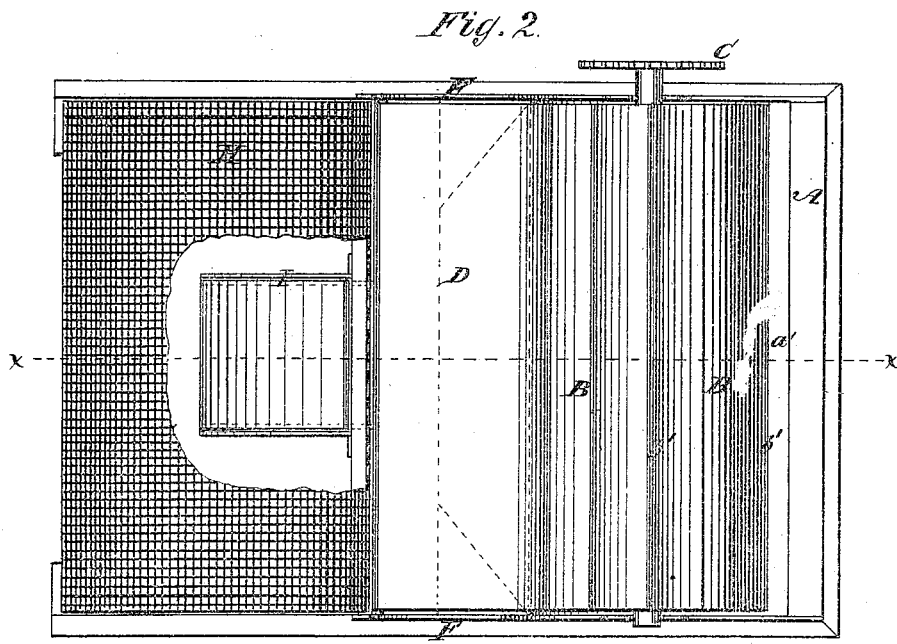

Be it known that we, ADDISON M. CHAPEL and JAMES G. HUBBARD, of Pittsfield, in the county of Berkshire and State of Massachusetts, have invented a new and useful Improvement in Fly-Trap, of which the following is a specification:

Figure 1 is a detail longitudinal section of our improved fly-trap taken through the line $x\ x$, Fig. 2. Fig. 2 is a top view of the same, part of the case being broken away to show the construction.

Similar letters of reference indicate corresponding parts.

Our invention has for its object to furnish an improved fly-trap, simple in construction, convenient in use, and effective in operation; and it consists in the combination of a trapping mechanism and a prison or cage peculiarly constructed and adapted to each other, as hereinafter described.

A represents a box or block of any convenient size, in the forward part of the top of which is formed a semi-cylindrical cavity, $a^1$, as shown in Fig. 1. B is a cylinder, the journals of which revolve in supports attached to the ends of the box or block A. To the sides of the cylinder B are attached ribs or gates $b'$, three or more, of such a height as to touch or almost touch the surface of the concavity $a^1$, and at such a distance apart that one or more of said ribs may always be within the concavity $a^1$. To one of the journals of the cylinder $b\ b'$ is attached a gear-wheel, C, with which a clock-work (not shown in the drawing) is connected to revolve the said cylinder. Upon the face of the cylinder B, between the gates $b'$, is placed the fly-bait, seeking which the flies alight upon the said cylinder and are carried into the concavity $a^1$, the gate $b'$ in their rear preventing them from returning. D is a scraper, which is pivoted at its rear edge to the rear part of the top of the box or block A, and which is made of such a breadth that its forward edge may come so close to the body of the cylinder B that a fly cannot pass between them, and which thus scrapes off the flies from said cylinder. As the gates $b'$ come to the scraper D they raise it upon its pivots and pass by. The scraper D is prevented from dropping down so far as to come in contact with the body of the cylinder B by stops E attached to the block A, and upon which the scraper D rests except when raised by the gates $b'$. The flies are prevented from escaping at the ends of the scraper D, when raised, by plates or flanges F attached to the block or box A. In the top of the block or box A, beneath the scraper D, is formed a passage, $a^2$, leading to the spout G, through which the flies see light, and, passing toward it, they enter the cage H. The spout G is permanently attached to the rear side of the box or block A, and fits into the spout I attached to the forward side of the cage H. The top of the spout I is pivoted at its outer edge, and rests upon the top of the spout G, so that when the cage H is detached it may drop down and close the said spout I to prevent the escape of the flies. The cage H is made detachable, so that it may be conveniently detached to destroy the caged flies when desired.

Having thus described our invention, we claim as new and desire to secure by Letters Patent—

The combination, with the cage H provided with the spout I having a hinged valve, and the trapping apparatus consisting of the ribbed cylinder B $b'$, the block A with the dry concavity $a^1$, and the passage $a^2$, and the scraper D supported on the post E, as shown and described.

ADDISON M. CHAPEL.
JAMES G. HUBBARD.

Witnesses:
  E. M. WOOD,
  GEO. DUCKWORTH.